United States Patent [19]

Welch et al.

[11] Patent Number: 5,611,974
[45] Date of Patent: Mar. 18, 1997

[54] METHOD FOR PREPARING OR REPAIRING A MACHINE FOUNDATION

[75] Inventors: William L. Welch, Houston; Don W. Sluder, Lake Jackson; Wallace D. Hill, Pasadena, all of Tex.

[73] Assignee: Welch-Sluder IP Partners, Houston, Tex.

[21] Appl. No.: 509,825

[22] Filed: Jul. 1, 1995

Related U.S. Application Data

[60] Division of Ser. No. 962,968, Nov. 16, 1992, Pat. No. 5,437,430, which is a continuation-in-part of Ser. No. 625,293, Dec. 10, 1990, Pat. No. 5,165,651, which is a continuation-in-part of Ser. No. 449,608, Dec. 11, 1989, abandoned.

[51] Int. Cl.$^6$ .............................. B32B 35/00; E04B 1/16
[52] U.S. Cl. ............................. 264/34; 264/35; 264/36
[58] Field of Search .................... 264/36, 32, 35, 264/34, 256, 279, 279.1, 277, 278

[56] References Cited

U.S. PATENT DOCUMENTS

| | | | |
|---|---|---|---|
| 410,811 | 9/1889 | Stevens | 248/678 |
| 1,355,122 | 10/1920 | Bintliff | 264/35 |
| 1,807,948 | 6/1931 | Wolters | 264/277 |
| 2,240,427 | 4/1941 | Thomsen | 72/105 |
| 2,678,592 | 5/1954 | Wiedman | 248/678 |
| 2,802,632 | 8/1957 | Byers | 248/19 |
| 2,842,955 | 7/1958 | Pederson . | |
| 2,916,233 | 12/1959 | Ecker | 248/19 |
| 2,998,216 | 8/1961 | Hurd | 248/19 |
| 3,120,572 | 2/1964 | Shannon | 264/277 X |
| 3,194,853 | 7/1965 | Weise et al. | 264/36 |
| 3,194,867 | 7/1965 | Shannon | 264/277 X |
| 3,592,437 | 9/1971 | Dashow | 249/134 X |
| 3,654,018 | 4/1972 | Bogue | 156/245 |
| 3,788,581 | 1/1974 | Rutzick | 248/678 |
| 3,822,158 | 7/1974 | Hoffman et al. | 264/36 X |
| 3,953,029 | 4/1976 | Boyd | 248/910 X |
| 4,050,659 | 9/1977 | McCannon | 248/346 |
| 4,134,562 | 1/1979 | Paakkinen | 248/639 |
| 4,175,311 | 11/1979 | Bunyan | 264/36 X |
| 4,336,677 | 6/1982 | Ossbahr | 248/639 X |
| 4,505,449 | 3/1983 | Turner | 248/678 |
| 4,591,466 | 5/1986 | Murray et al. | 264/35 |
| 4,632,346 | 12/1986 | Wilson | 248/176 |
| 4,670,208 | 6/1987 | Koblischek et al. | 264/250 |
| 4,694,190 | 9/1987 | Lane et al. . | |
| 4,731,915 | 3/1988 | Holder | 29/402.03 |
| 4,751,031 | 6/1988 | Baars | 264/35 |
| 4,808,356 | 2/1989 | West et al. | 264/278 X |
| 4,826,127 | 5/1989 | Koblischek et al. | 248/679 |
| 4,869,456 | 9/1989 | Jacobs | 248/678 |
| 5,016,338 | 5/1991 | Rowan, Jr. | 264/35 X |
| 5,063,006 | 11/1991 | Tahara | 264/35 |
| 5,076,534 | 12/1991 | Adam | 248/678 |
| 5,126,095 | 6/1992 | Crosno et al. | 264/278 X |
| 5,229,051 | 7/1993 | Martin | 264/279 X |
| 5,376,315 | 12/1994 | Fricke | 264/279 X |
| 5,388,317 | 2/1995 | Johansen et al. | 264/36 X |
| 5,507,427 | 4/1996 | Burgett | 264/277 X |

FOREIGN PATENT DOCUMENTS

| | | | |
|---|---|---|---|
| 875957 | 10/1942 | France | 248/639 |
| 2100328 | 7/1971 | Germany | 248/910 |
| 2071635 | 3/1971 | United Kingdom . | |

OTHER PUBLICATIONS

* UK Patent Application GB 2071635A – corresponds to U.S. 4,382,820 Oct. 5, 1983 to Inoue.

*Primary Examiner*—Karen Aftergut
*Attorney, Agent, or Firm*—Kurt S. Myers

[57] ABSTRACT

The present invention is directed to a method for preparing or repairing a machine foundation by using a hollow form which surrounds vertically extending reinforcement rods and is filled with a fortifying material to secure the hollow form to a slab. The form is preferably made of an aggregate filled thermosetting resin or a thermoplastic resin which are corrosion and chemical resistant materials free from fluid attack such as the liquids in the machine, for example, in a pump the fluids being either the lubricating fluids or the fluids being pumped. More particularly, the present invention is directed to a hollow form which may be used either to prepare a machine foundation or to repair a degraded slab or foundation and preferably is a single form.

11 Claims, 8 Drawing Sheets

METHOD FOR PREPARING OR REPAIRING A MACHINE FOUNDATION

This application is a divisional application of U.S. patent application Ser. No. 07/962,968 filed Nov. 16, 1992 entitled "METHOD FOR PREPARING OR REPAIRING A MACHINE FOUNDATION", now U.S. Pat. No. 5,437,430, which is a continuation-in-part of application of U.S. patent application Ser. No. 07/625,293 filed Dec. 10, 1990 entitled "MACHINE FOUNDATION AND METHOD FOR PREPARING OR REPAIRING A MACHINE FOUNDATION", now U.S. Pat. No. 5,165,651 which is a continuation-in-part application of U.S. patent application Ser. No. 07/449,608 filed Dec. 11, 1989 entitled "MACHINE FOUNDATION AND METHOD FOR PREPARING OR REPAIRING A MACHINE FOUNDATION", now abandoned.

BACKGROUND OF THE INVENTION

1. Field of the Invention

The present invention is directed to a method for preparing or repairing a machine foundation such as a foundation for a pump. More specifically, the method of the present invention uses a precast form, preferably made of an aggregate filled thermosetting resin or a thermoplastic resin which are corrosion and chemical resistant materials free from fluid attack such as the liquids in the machine.

2. Background of the Invention

Bases for equipment such as pumps have been pre-formed and designed for specific purposes such as to collect leaking liquids as illustrated by U.S. Pat. No. 2,916,233. Molds have been used to cast a reusable foundation for a pump jack as disclosed in U.S. Pat. No. 2,998,216.

Machine bases have used corrosion resistant materials such as disclosed in U.S. Pat. No. 4,632,346 and U.S. Pat. No. 4,731,915. In each of these patents epoxy materials are disclosed.

U.S. Pat. Nos. 4,670,208 and 4,826,127 disclose a method of manufacturing machine supports from acrylic concrete. These patents disclose various machine supports made from mixtures of aggregates and methacrylate monomer being poured into a prepared mold.

None of the prior art patents disclose a form made of an aggregate filled thermosetting resin or a thermoplastic resin which may be filled with a fortifying material to make a pump or other equipment foundation.

SUMMARY OF THE INVENTION

The present invention is directed to a method for preparing or repairing a machine foundation by using a hollow form which surrounds vertically extending reinforcement rods and is filled with a fortifying material to secure the hollow form to a slab. The form is preferably made of an aggregate filled thermosetting resin or a thermoplastic resin which are corrosion and chemical resistant materials free from fluid attack such as the liquids in the machine, for example, in a pump the fluids being either the lubricating fluids or the fluids being pumped. More particularly, the present invention is directed to a hollow form which may be used either to prepare a machine foundation or to repair a degraded slab or foundation and preferably is a single form.

BRIEF DESCRIPTION OF THE PREFERRED EMBODIMENTS

The present invention is directed to forms which are used either in the preparation or the repair of machine foundations. Machines such as pumps and other equipment are usually bolted to concrete bases to secure the machines in place. The present invention is directed to preparing or repairing machine foundations with a precast, injection molded or welded form. By making the form from a material which will not be attacked by the materials handled by the machines such as the liquid being pumped by a pump or by the lubricating fluids such as oils or greases, the life of the machine foundation may be extended and the foundation may be kept more easily in repair. A material which is free from fluid attack is meant herein as a material which is not absorbent, is corrosion resistant, will not react with the fluids in the machine and will retain structural integrity and preferably is either an aggregate filled thermosetting resin or a thermoplastic resin. Further, by making the machine foundation from a material that is not subject to attack and has a surface that can be cleaned, overcomes the significant disadvantages of ordinary portland cement concretes. Ordinary concretes absorb the fluids, often times to substantial levels within the base or foundation. Ordinary concretes, in the case of leaks or spills, will require the removal of the contaminated concrete and in the case of hazardous materials pose a problem to any cleaning procedures for cleaning the base or foundation.

Figure 1:
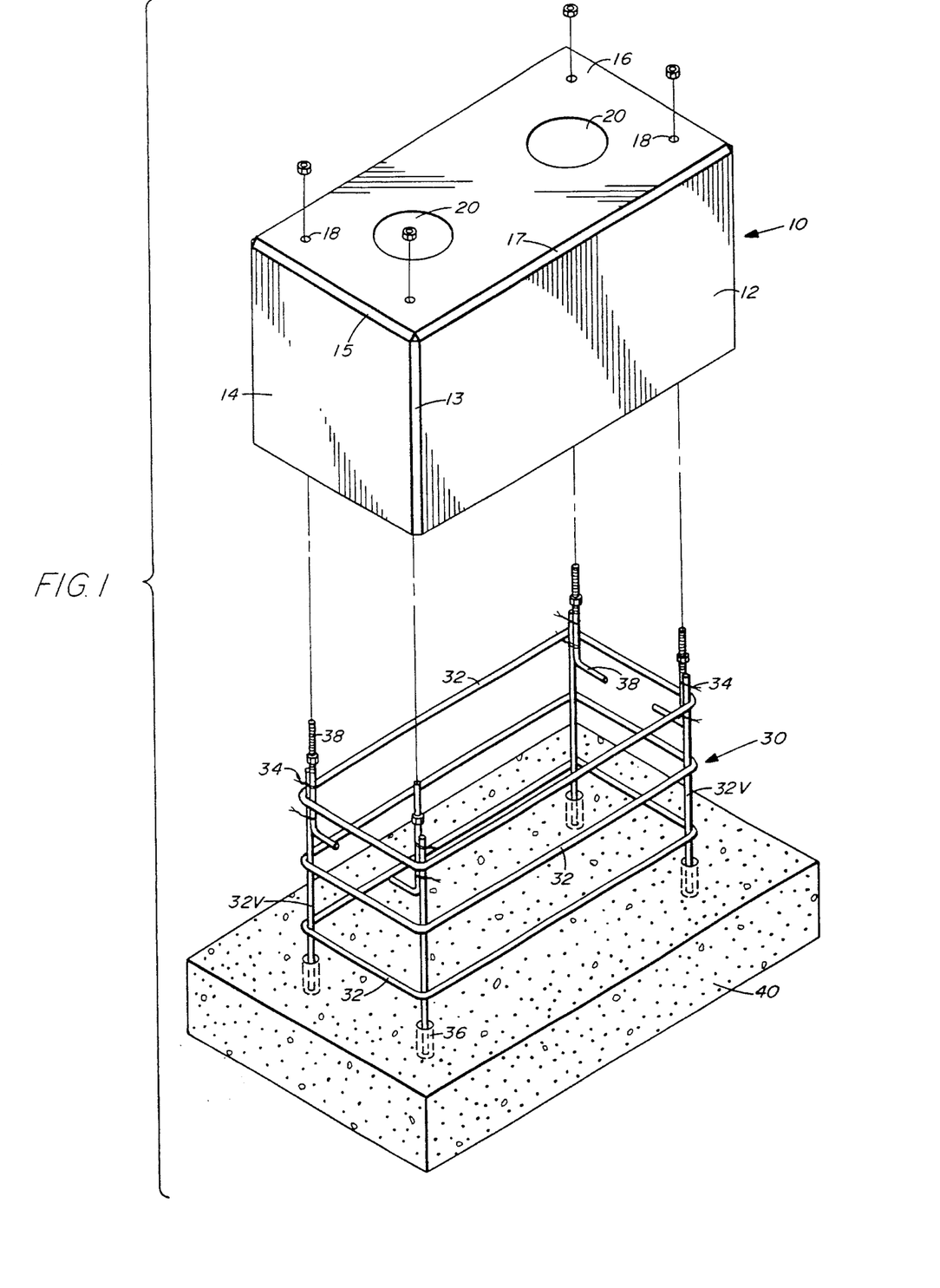
FIG. 1 is a perspective view of a hollow form of the present invention positioned above a maze of reinforcement rods which together will create a machine foundation.

Referring now to FIG. 1, a hollow form 10 which is the preferred embodiment of the present invention for preparing a machine foundation is shown. The form 10 is precast when made of an aggregate filled thermosetting resin or is either injection molded or welded when made from a thermoplastic resin as will be described in more detail hereinafter. A specific example of a thermosetting resin is an epoxy based polymer concrete which utilizes select graded and blended aggregates suspended in a polyamine cured epoxy binder which is sold under the tradename "PC-1400" a product of Gulf Coast Paint Manufacturing in Mobile, Ala. Another example of a thermosetting resin which exhibits particular resistance to attack by chlorinated solvents and polar solvents is a novalac based polymer concrete which is sold under the tradename "EN-27", a product of Koch Corrosion Control in Houston, Tex. Still another example of a thermosetting resin which exhibits particular resistance to attack by organic acids as well as a wide range of inorganic acidic and alkaline materials is a vinyl ester based polymer concrete which is sold under the tradename "SEMSTONE 884", a product of Sentry Polymers in Freeport, Tex. These specific examples are but a few of the commercially available thermosetting resins made by these manufacturers and by other manufacturers. The form 18 has vertical walls and in its preferred configuration is rectangular, has side walls 12 and end walls 14. The form 18 has a single horizontal wall namely upper wall 16. The form 10 has no lower horizontal wall and is hollow. The wall thicknesses may vary from ½ inch to 1½ inches in thickness. A form 10 may be made in any number of configurations and sizes but for most pieces of equipment, primarily for pumps and smaller pieces of equipment, such machines will easily fit on a form 10 where the top horizontal wall 16 is rectangular and has dimensions for example of four (4) feet along the side walls 12 and two (2) feet along the end walls 14. The height of the form 10 is sufficient to encompass any reinforcing structure used to construct or repair the machine foundation. The height therefore may be as little as six inches or up to two (2) feet or greater. The horizontal or upper wall 16 of form 10 may have a plurality of bolt openings 18 and has at least one opening 20. As shown in FIG. 1, the form 10 has two openings 20, which are used to fill the form 10 as will be described in more detail hereinafter.

In preparing a new machine foundation, the ground is leveled and a concrete slab 40 may be poured. Foundations and bases for machines such as pumps and the like have used ordinary portland concrete. However, such concrete is porous and subject to attack by fluids in the machines or equipment. In preparing a new foundation according to the present invention, the outside surface of the slab 40 or the entire slab is a polymeric concrete to provide a surface which is washable and not absorbent to the fluids used or moved in the machines. The slab 40 is poured to support a reinforcement maze 30 of reinforcement rods. As shown in FIG. 1, slab 40 may be much larger than the horizontal dimensions of form 10 or may be essentially the same size or even smaller so that the form 10 surrounds the slab 40. Reinforcement rods 32V which extend vertically are set by anchors 36 in the slab 40. These anchors 36 may be epoxy resins or mixtures which fill the drill holes or are mechanical wedges which anchor the reinforcement rods 32V into the slab 40. As shown in FIG. 1, there are four, for purposes of illustration, vertically extending rods 32V. To these vertical rods are attached the plurality of horizontal reinforcement rods 32 to form the reinforcement maze 30. The reinforcement rods 32 are connected together in the usual manner with tying wire 34 to form the maze 30. The maze 30 is constructed to provide strength and reinforcement to the material which will surround the maze 30 and provide the strength and support necessary for the machine. In addition the vertical extending rods 32 of the maze 30 provides the attachment to the slab 40 and secures the form 10 to the slab 40. As an example of a complete foundation, tie down bolts 38 may be attached to the maze 30 for securing the machine to its foundation. As shown in FIG. 1, four tie down bolts 38 are supported by maze 30 and will bolt down a particular machine. The form 10 is lowered from the position shown in FIG. 1 to surround the maze 30 and permit the tie-down bolts 38 to pass through the respective openings 18 in form 10. The form 10 sits on the slab 40 with the tie-down bolts 38 extending above the horizontal upper wall 16.

Figure 2:
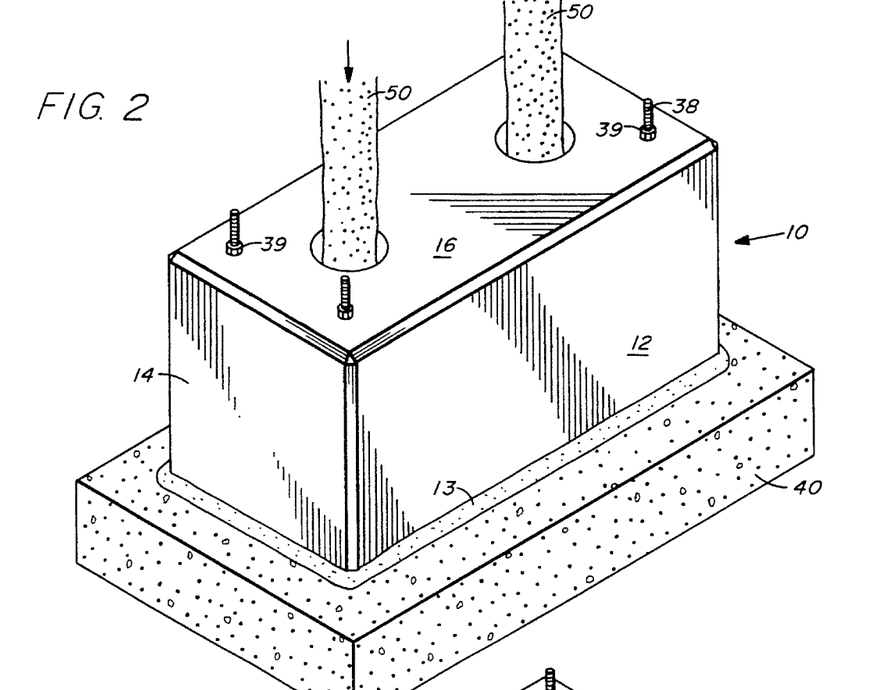
FIG. 2 is a perspective view of a hollow form of the present invention surrounding the maze of reinforcement rods and being filled with a setting, supportive material such as concrete.

The form is now in the position as shown in FIG. 2. A bead 13 of polymeric concrete or grout material is placed around the lower edge of form 10 to seal the form 10 to the slab 40. This bead 13 may be on the inside or outside of form 10. Since the machine foundation is constructed for a specific machine, the number and spacing of the tie down bolts 38 is predetermined or known for that specific machine. It is understood therefore that alternatively rather than the number and spacing of bolt openings 18 being part of producing the form 10, i.e. formed in the precast mold or injection molding operation, for example, the bolt openings 18 may be drilled into the horizontal wall 16. The use of a template having the spacing and number of openings 18 may be used. Then, instead of the tie down bolts 38 being affixed to the maze 30, the bolts 38 may be affixed to the form 10 by nuts 39. In this position (FIG. 2), a fortifying material 50 which will fill the form 10 is poured into openings 20 of the form 10 which surrounds the maze of reinforcement rods 32 and produces a reinforced concrete structure.

Figure 3:
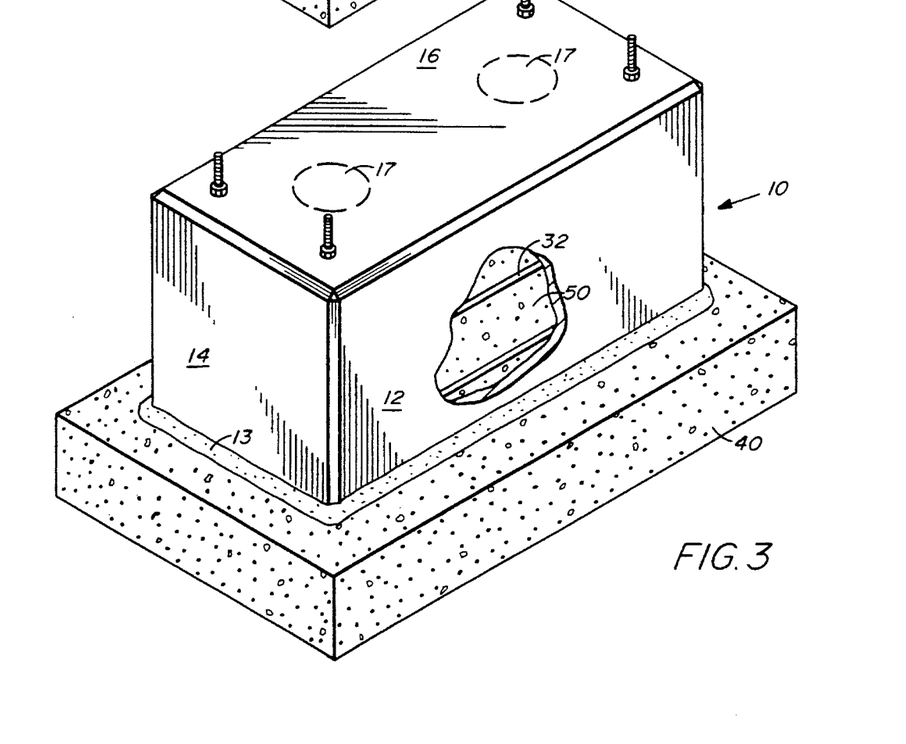
FIG. 3 is a perspective view partly in cross-section of the finished machine foundation of the present invention.

The fortifying material 50 used to fill the form 10 is a material which can be easily poured into the form 10 and surround the maze 30, which has fast setting properties, and which has very little shrinkage upon setting. The preferred fortifying materials are the polymer concretes as illustrated by the epoxy based polymer concretes which have all the desired properties. These epoxy based polymer concretes are commercially available from a number of sources. A specific example is epoxy based polymer concrete which utilizes select graded and blended aggregates suspended in a polyamine cured epoxy binder which is sold under the tradename "PC-1400" a product of Gulf Coast Paint Manufacturing in Mobile, Ala. One of the advantages of using a polymer concrete is that the concrete does not shrink upon setting and another is that the same material is used as the fortifying material as used in making the form 10. The compressive strength of these commercially available polymer concretes are within the range of 15,000 to 20,000 psi. The finished base is shown in FIG. 3. Therefore, the fortifying material 50 is selected from a wide range of materials including the polymer concrete used in construction of the form 10, other polymer concretes or even ordinary portland cement which may contain additives to control the extent of shrinkage upon curing. Another specific example of the fortifying material 50 are the known non-shrinking cementitious grouts.

The form 10 may be made or constructed of various thermosetting or thermoplastic materials. When thermosetting resins are the material of construction the form 10 is preferably precast, while when thermoplastic resins are used injection molding or welding are the preferred manner of construction. Thermosetting resins are such materials as the epoxy resins and the multicomponent epoxy resins, the styrene butadiene latexes, the acrylic latexes, the phenolic epoxy resins, the polyurethane resins, the polyester resins, the vinyl ester resins and the like. In using the thermosetting materials they are often used in combinations as well as being aggregate filled. By aggregate filled is meant that materials such as sand or rock such as silica or other mineral based solids or materials such as flint quartz, glass, fibers or other materials, such as a sheet of fiber glass or the like, are added to the thermosetting resins as fillers to increase strength. These aggregate filled thermosetting materials are already used as materials to top or restore concrete surfaces and are known material for such use. According to the present invention however, a form 10 as described hereinabove is produced by casting these materials in the shape desired to form or repair a machine foundation. On the other hand, if thermoplastic resins are employed to produce the form 10 then materials such as the polyolefins, specifically high density polyethylene or polypropylene, polyvinylchlorides or polycarbonates or even materials such as the polyesters, polyethersulfones, polyether ketones or polyether imides are used. These thermoplastic materials are preferably injection molded to produce the form 10.

Figure 4:
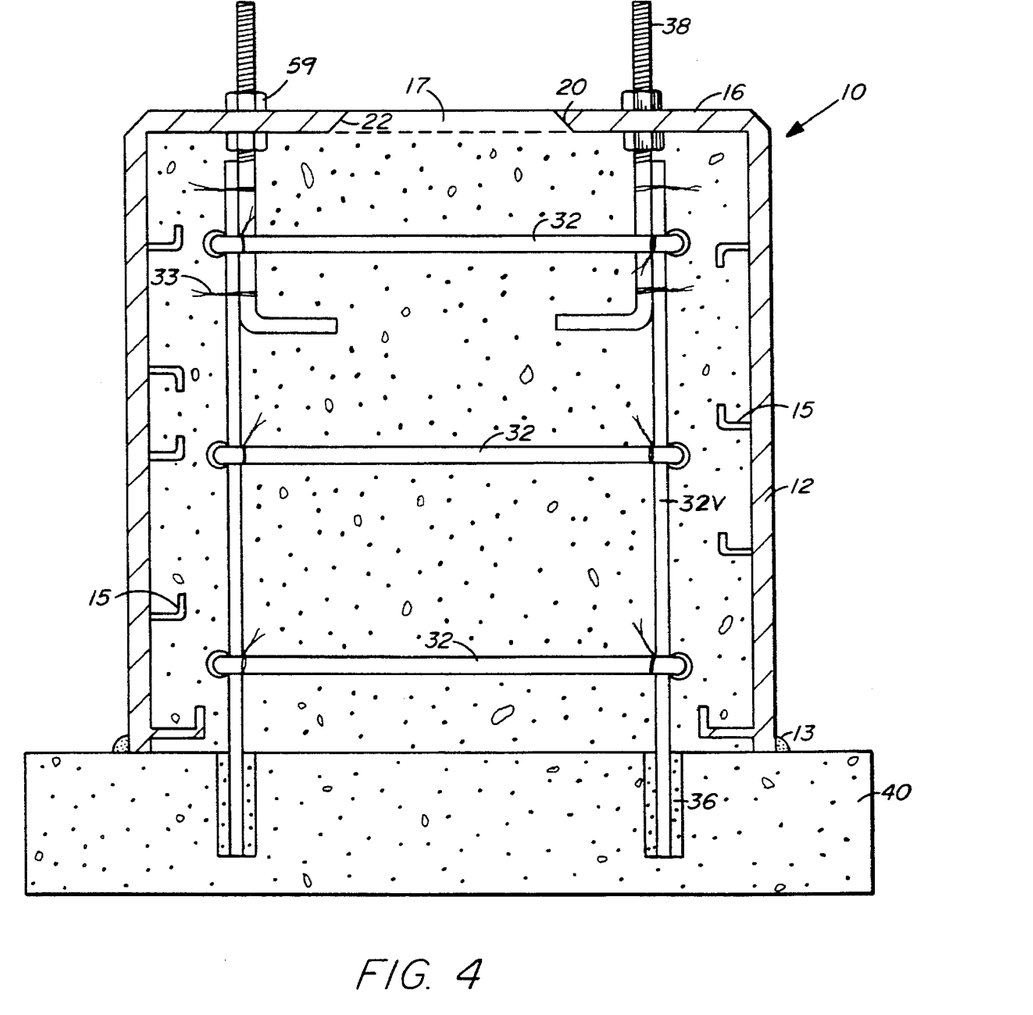
FIG. 4 is a cross-sectional view of the finished machine foundation of the present invention.

There are features of the form 10 which are optional and two of which are shown in FIG. 4. Internal of wall 12 and wall 14 may be a plurality of angle pieces 15 which provides a surface for the fortifying material 50 to compress and retain the frame 10 on the slab 40. Moreover, the piece 15 provides for an integral structure between the form 10 and the material 50 which fills the form 10. A further detail is in regard to the opening 20. In a precast form 10 when made of a thermosetting material, the opening 20 may have a tapered surface 22, tapered from a smaller diameter at the top surface to a larger diameter at the bottom surface of top wall 16. After the setting material 50 fills the form 10 up to the bottom surface of horizontal wall 16, a layer of aggregate filled thermosetting resin 17 which preferably is the same material used to precast the form 10, is used to close the opening 20. On the other hand, the openings 20 of an injection molded form 10 may be formed for a cap, either a screw or snap cap, to close the opening. Further as shown in FIG. 4, nuts 59 may be used on the tie down bolts 38 above and below the wall 16. As shown in FIG. 1, after the form 10 is positioned a person can place a hand in the opening 20 and adjust the tie down bolts 38 so that they are properly positioned on the lower surface of upper wall 16 before the setting material 50 is introduced into the form 10. The opening 20 is preferably large enough to insert a tool to make certain that the setting material 50 completely fills the form 10.

An optional feature of form 10 (not shown) is that when the form has a substantial dimension, for example is over six feet long that baffles or internal walls will provide small compartments to be filled rather than a single or the total hollow space. The baffled compartments are to insure that cavities or voids will not occur in the fortifying material 50 and that shrinkage is minimized.

Referring to FIG. 4, a cross-section of the finished machine foundation is shown. The form 10 is sitting on a slab 40 and provides the base for the machine. The maze 30 has vertical bars 32V anchored in anchors 36 in the slab 40. The maze 30 is made up of a plurality of rebars or reinforcement rods 32. Inside the form 10 is fortifying material 50. The tie-down bolts 38 are secured to the upper horizontal wall 16 of the form 10 in the proper position for the machine.

FIGS. 1 to 4 not only depict a preferred embodiment of a hollow form 10 of the present invention, especially when the form is made from a thermosetting resin, which provides a fluid resistant machine base but also provides the basis for describing an easy method for preparing a machine foundation according to the present invention. The form 10, made from an aggregate filled thermosetting resin or thermoplastic resin, is brought to the site. The slab 40 is laid and the maze 30 erected. The form 10 is set in place. It should not be overlooked how easy these steps are as contrasted to attempting to construct in the field a foundation free from fluid attack. Most forms 10 of the present invention can be set in place by one man or no more than two simply by lifting and setting the form 10 in place. The form 10 optionally may be sealed with a bead 13 of the polymeric concrete used in making the form 10 or if the form 10 is a polyolefin such as high density polyethylene for example, the sealing material may be an epoxy based material. After making certain that the tie down bolts 38 are affixed to the upper surface of the form 10 and adjusted for the machine, fortifying material 50 is added to fill the form 10 to a point or level above the lowest angle pieces 15. Preferably, this amount of material 50 will compress the form 10 on the slab 40 and then is allowed to set so that leakage, if any, may be spotted and corrected before completely filling the form 10. The form 10 is then filled to the capacity of the hollow interior of the form 10. The opening 20 is closed either by using a layer of the aggregate filled thermosetting material when the form 10 is made of that material or by a cap if made from a thermoplastic material.

The steps of making a form 10 from a thermosetting resin are set forth in Ser. No. 07/625,293, which is incorporated herein by reference. The installation of the form to repair an existing pump base and/or foundation is as follows:

1. An existing steel pump base and pump are removed from an existing concrete pump foundation.

2. Measurements are taken to determine the required elevation, longitude and latitude for setting a new pump base or specifically the precast form and replacing the pump.

3. Damaged and degraded areas of the existing concrete pump foundation are removed by a pneumatic chipping gun.

4. Existing pump anchor bolts may be lengthened and reused.

5. Measurements are taken of the bolt hole pattern and marked on top of the precast form.

6. Four holes are drilled through the top of the precast form using a ½ in. masonry drill bit.

7. (Optional) The existing concrete pump foundation and the interior and exterior of the precast form are dry abrasive blasted to clean and remove surface contamination.

8. The precast hollow form is then placed over the existing pump foundation with the pump anchor bolts fitting through the pre-drilled holes in the top of the precast form.

9. The precast form is held in place by nuts securely fastened to the pump anchor bolts.

10. Polymer concrete is then prepared and is poured into the formed hole in top of the precast form so that the space between the existing concrete pump foundation and the interior surface of the precast form is completely filled. Alternately, a non-shrinking, non-expanding cementitious grout may be used to fill the form.

11. The hold down nuts are removed after allowing curing for one hour.

12. (optional or alternately gel coating the exterior during manufacture) The exterior of the precast form is then dry abrasive blasted and is top coated with a nominal 10-mil thick application of cycloaliphatic amine cured novolac epoxy manufactured by Gulf Coast Paint Manufacturing, Mobile, Ala. and sold under the tradename "PC-555".

13. The pump is then installed on top of the filled precast form which creates a chemical resistant foundation.

The forgoing example illustrates repairing a foundation with a form 10 of the present invention made of a thermosetting resin. Specifically, the example included an epoxy resin but other thermosetting resins or composite materials may be used.

According to the method of the present invention, a new foundation or a repair of an existing foundation can be installed using a form made from thermosetting resins, thermoplastic resins or even with a preformed concrete. The method of the present invention using a precast form eliminates the waiting time necessary for preparing the usual wooden form, pouring the concrete and then waiting for the concrete to cure before the machine, such as a pump, can be affixed to the foundation. In contrast to a time of several days to twenty days, when waiting for sufficient curing so that the concrete may be coated, the precast form may be set and filled in one day and the next day the machine set in place or replaced. This is of great importance to eliminate long down times when repairs are made.

Figure 5:
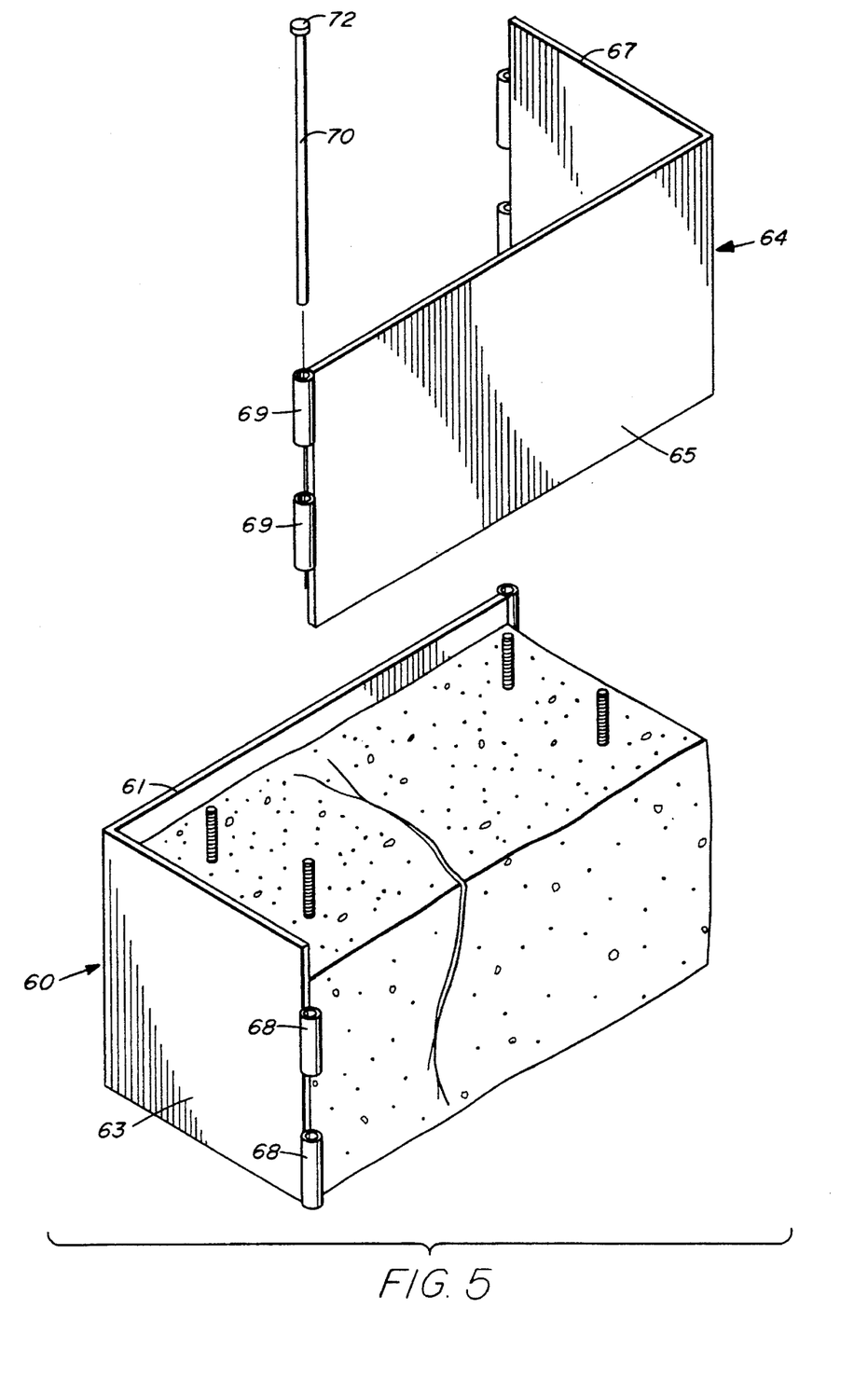
FIG. 5 is another embodiment of the present invention wherein there are two pieces to the form used in repairing a machine foundation, one of the pieces surrounding a degraded concrete base to be repaired and the second piece of the form which is shown about to be positioned around the degraded base.

Referring now to FIG. 5 another modification of the present invention may be employed to repair a cracked or degraded machine base. In this embodiment the hollow form is made from two forms having vertical walls made of either an aggregate filled thermosetting resin or thermoplastic resin which may be easily joined together to surround the existing degraded base. As depicted in FIG. 5 there are two vertical wall forms 60 and 64. Form 60 has a side wall 61 and an end wall 63. Comparable walls of form 64 are side wall 65 and end wall 67. Each of the forms 60 and 64 are provided with an easy attachment to each other such as tubular member 68 on end wall 63 and tubular member 69 on end wall 67. Through tubular members 68 and 69 a pin 70 is inserted to hold the two forms 60 and 64 together. The pin 70 has a large head 72 which will not fit through the tubular members 68 and 69 but secures form 60 and 64 in place around the degraded base. The precast forms 60 and 64 are placed around the slab one at a time and connected at both connecting edges. A sealing material such as an epoxy resin or suitable adhesive for the aggregate filled thermosetting resin or thermoplastic resin may be applied along the inner edges of forms 62 and 64 where the two edges are connected by pins 70. It is understood that there are two connecting edges. Once the forms are in place the hollow form is filled with a setting material 50 similarly as form 10 substantially to the top of the form. As shown in FIG. 5, 82 depicts a fill level for the filling or pouring of fortifying material within the forms 60 and 64. The fortifying material is allowed to set and thereafter the form is then filled with a layer of the same material which was used in making the forms 60 and 64. When the fortifying material 50 is the same material used to make the forms 60 and 64 then the form is completely filled in one step. Again a completed foundation formed of a material free from fluid attack is thereby produced.

Another alternative of the two-piece form 10 is to have a single form having the side walls 12 and 14 and a second, separate top piece 16. This alternative is especially advantageous for repairing a large foundation such as a pump base. This permits that the side wall of form 10 to be placed around an existing or repaired maze and having clear access to filling the area between the maze and the side wall form. The single horizontal wall 16 or top is placed on the form 10, after the tie down bolts have been set and the form substantially filled with fortifying material 50, and a layer of uncured thermosetting resin is applied to fill the form. The top 16 is pulled down by using the tie down bolts so that the excess of uncured resin is forced up the openings around the tie down bolts as well as openings 20.

The above examples illustrate that the form 10 may be constructed in the field with pieces being pre-formed.

Figure 6:
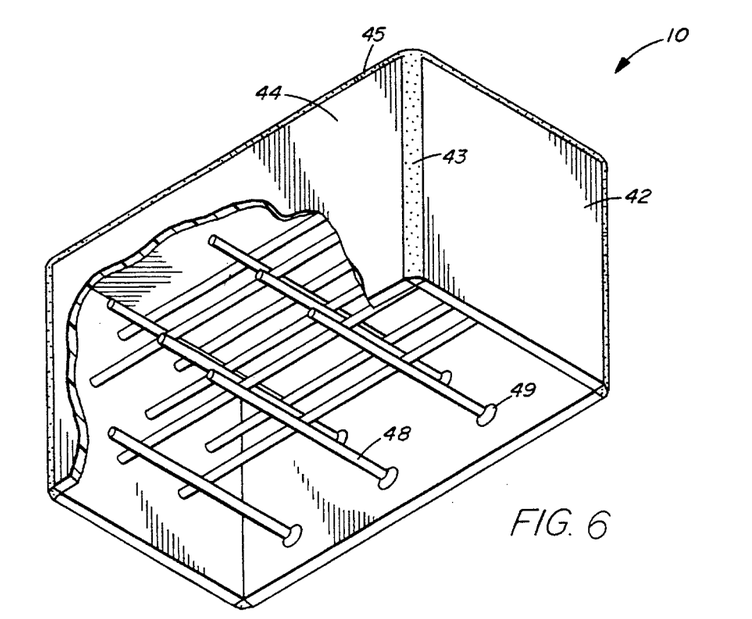
FIG. 6 is another embodiment of the present invention wherein the form is made of a thermoplastic resin such as polyethylene sheets welded together and having a welded maze of polyethylene rods affixed to the form.
Figure 7:
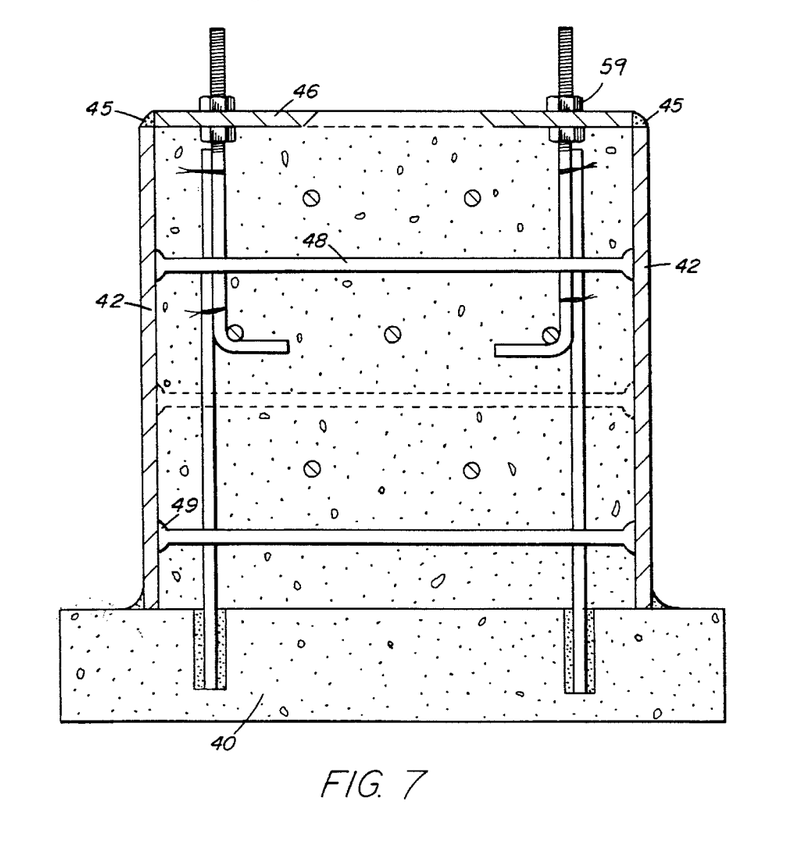
FIG. 7 is a cross-sectional view of the form illustrated in FIG. 6.

To construct a form 10 from a thermoplastic resin, specifically polyethylene, a simple and effective manner of making a form 10 is by welding sheets of the thermoplastic resin together. Referring to FIGS. 6 and 7, side walls 42 and 44 of a form 10 may be made from sheets of polyethylene. Polyethylene is heated above its melting point and applied as a weld bead 43 to the adjoining edges of the sheets of polyethylene, for example, between side sheet 42 and sheet 44, welding the two sheets 42 and 44 together. In a like manner sheet 44 is joined to top sheet 46 by a bead 45 of polyethylene and top sheet 16 is joined to side sheet 12 by weld bead 47 (not shown). With this construction of the form 10 using a thermoplastic resin such as polyethylene, a form 10 may be made which is relatively light in weight yet sturdy and completely free from fluid attack. Various modifications are possible to secure the thermoplastic form 10 to the slab 40 while the fortifying material 50 is poured into the form 10. For example, pieces of sheet polyethylene may be welded to the bottom of form 10 and bolted to the slab 40.

A feature of a form 10 made from thermoplastic sheets as illustrated in FIGS. 6 and 7 is that a maze, comparable to the maze 30, may be made internal of and a part of the form 10. Rods 48 of polyethylene or metal surrounded by polyethylene are cut and welded to the side walls either from side wall 42 to 42 or side wall 44 to 44. The weld beads 49 of polyethylene affix the rods 48 to the walls. The maze of rods 48 when surrounded by the fortifying material 50 which fills the hollow portion of the form 10 secures the form 10 to the slab 40. A fortifying material 50 such as a 3000 psi portland cement concrete, a material which is commonly used in pouring the slab 40, may be used to fill the form 10 and surround the rods 48 such as to assure that the form 10 is solidly affixed to the slab 40. A further example of fortifying material used with the thermoplastic resin form 10 and which has a slight expansion property is a product sold under the tradename "Supreme Expanding Grout", a product of Gifford-Hill in Houston, Tex. The advantage of a expanding fortifying material 50 in a polyethylene form 10 is that the form will be under tension and thus a stronger more solid foundation is produced.

Figure 8:
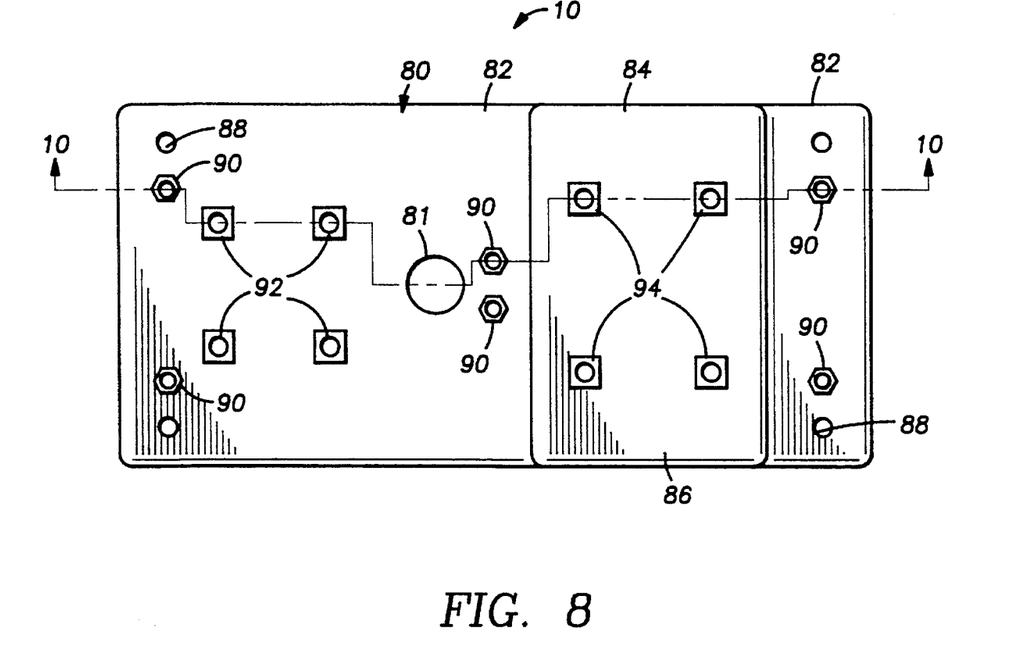
FIG. 8 is a top view of another embodiment of a form which has a horizontal wall with two horizontal upper surfaces for attaching a machine.

Referring now to FIG. 8, another embodiment of the form 10 is shown which has more than one horizontal surface on the top wall 80 on which the machine is attached. Machine bases, usually made of metal, are used to set, level and align each part of the machine on the foundations presently used. Form 10 has more than one surface, illustrated by an upper wall 80 having a lower horizontal surface 82 and a higher horizontal surface 84, on which the machine is attached, see FIG. 9. As many surfaces as needed may be cast into form 10. In this embodiment, the form 10 has a precast machine base 86 as part of the form 10. In other words, instead of using a metal machine base which may be corrosive to provide the different horizontal surfaces required, the form 10 is precast to have the necessary surfaces for the machine. A machine such as a centrifugal pump will have the pump housing and a motor, and the shaft of the motor and the center of a pump housing must be on the same horizontal level rather than the feet of the respective pieces. However, the motor is usually smaller than the pump housing of a medium to large size centrifugal pump and must sit on a base, precast base 86, to raise the shaft of the motor to the same horizontal level as the connecting shaft or connection to the centrifugal pump housing.

Figure 9:
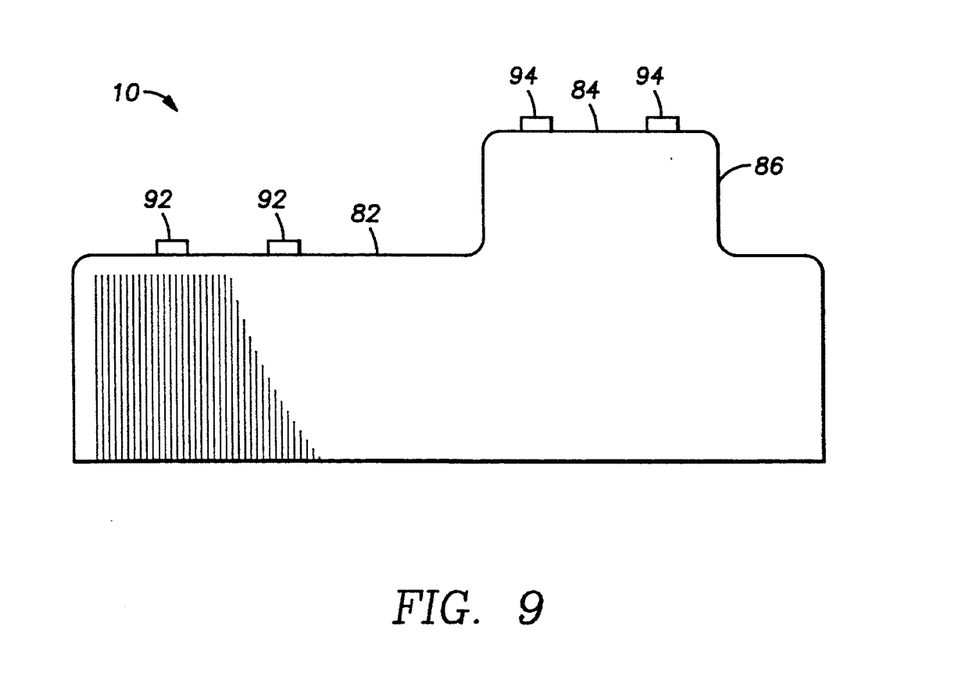
FIG. 9 is a side view of the form having two horizontal surfaces.
Figure 10:
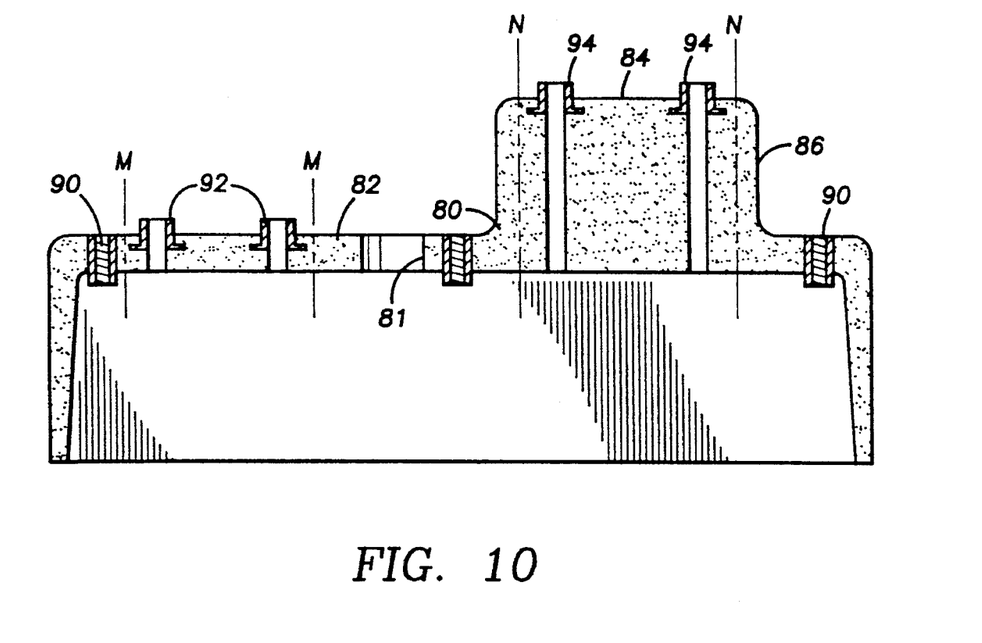
FIG. 10 is a cross-sectional view along line 10—10 of FIG. 8.
Figure 11:
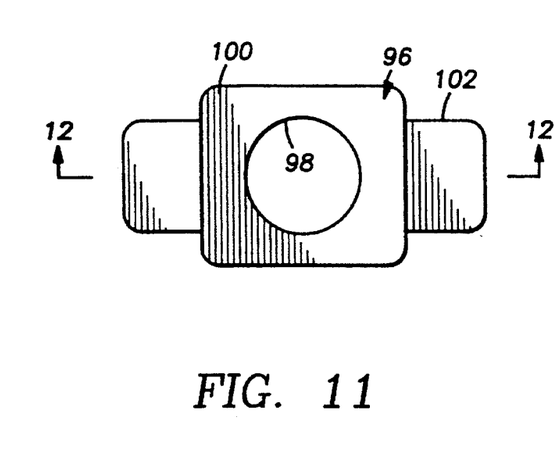
FIG. 11 is a top view of one of the metal footings for the machine which is embedded into the top wall of the form of FIG. 8.
Figure 12:
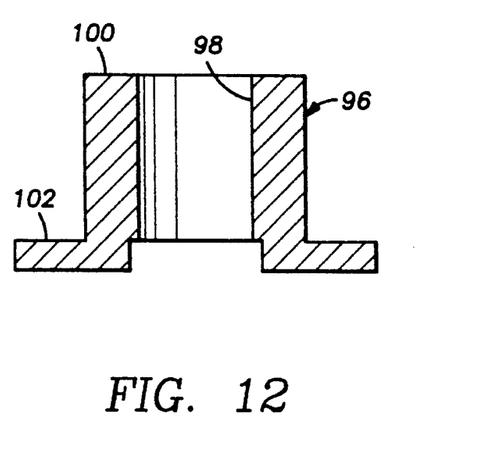
FIG. 12 is a cross-sectional view along line 12—12 of FIG. 11 of a metal footing.

The upper wall 80 of this embodiment has anchor bolt holes 88, usually two at each end, for the anchor bolts (similarly as shown in FIG. 1) attached to the maze of reinforcement rods to enter as the form 10 is placed over the maze. Alternatively, the anchor bolts may be attached or anchored to the slab 40. Jack bolts having footings (not shown) are inserted into the jack bolt threaded openings 90 before the form 10 is lowered into place. The jack bolts are used to align and level the top surfaces 82 and 84 of the form 10. The top surfaces 82 and 84 are flat surfaces from the molding techniques used and may be used for attaching the two pieces of a machine. However, in the embodiment shown, footing 92 and 94 are precast in the surfaces 82 and 84, respectively. These footings, 92 and 94, in one embodiment are made of machinable metal and set in the mold before the thermosetting material is introduced. Alternately, these footings, 92 and 94, may be made of machinable thermosetting material as will be explained in greater detail hereinafter. The footings 92 and 94, as shown in FIGS. 9 and 10, are above the surfaces 82 and 84, respectively. The form 10 after being formed can be placed into a chuck where the footings 92 and 94 are machined such that the footings will provide a level and horizontal surface for the pump housing and motor. In addition, the machining allows the tolerance of the horizontal distance between the footings 92 and the footings 94 to be ±0.01". The footings, as shown in FIGS. 11 and 12, are metal pieces, usually an exotic alloy such as alloy 20, 316 stainless steel or monel, having a body 96 of a size and shape which is larger than the bolt openings 98 which are drilled and provide sufficient surface 100 to hold either the pump housing or motor. To aid in the drilling of the bolt openings 96 below the footings 92 or 94 and through the top wall 80, wooden dowels may be placed below the footings before the top wall 80 is cast. Instead of an opening 96 for a bolt and nut, the opening 96 may be threaded for a fastener such as a screw. At the lower end of the body 96 are two feet 102 which secure the footing 92 or 94 in the upper wall 80 of the form 10.

Alternately, instead of metal footings 92 and 94, the sections M—M and N—N, which may extend further than that shown, may be made from a thermosetting polymer material which is filled with an aggregate which can be easily machined to provide a flat surface for the machine and tapped to provide openings for attaching the machine. For example, the entire upper wall 80, including the raised footing, may be made of a machinable thermosetting material. A metal aggregate may be used, especially in the material forming the top surface of the wall 80. Powdered metal aggregates of the non-corrosive metals such as alloy 20, 316 stainless steel or monel having a particle size which passes through a 325 mesh may be added to the thermosetting polymer materials used to construct or make the form 10. The surfaces of top wall 80, either the entire top surfaces or the raised footing or only within the sections M—M and N—N, are machined in the same manner as the footings 92 and 94 made of metal as explained hereinabove. It has been found, however, that the surfaces 82 and 84 can be made as flat as a machined surface and the distances between the two sur faces can be within acceptable tolerances without machining.

This embodiment of the form 10 as shown in FIGS. 8–10 has a built-in base for the pump housing and motor and is placed or set over a maze 30 of reinforcement rods similarly as the mold 10 in FIG. 1 or over a repaired foundation. In this embodiment when no separate machine base is used, the machine may be first attached and secured to the form 10 before the form is placed over the maze 30. This permits the alignment and leveling of the machine in the shop where tools may be used that are more difficult or impossible to use in the field. Eliminating a base, especially a metal base, allows moving or transporting of the machine and base without the machine losing its alignment. The form 10, either by itself or with the machine attached, is then filled with a fortifying material 50 such as a polymer concrete or a non-shrinking cementitious grout through the opening 81 in the top wall 80 of form 10.

Figure 13:
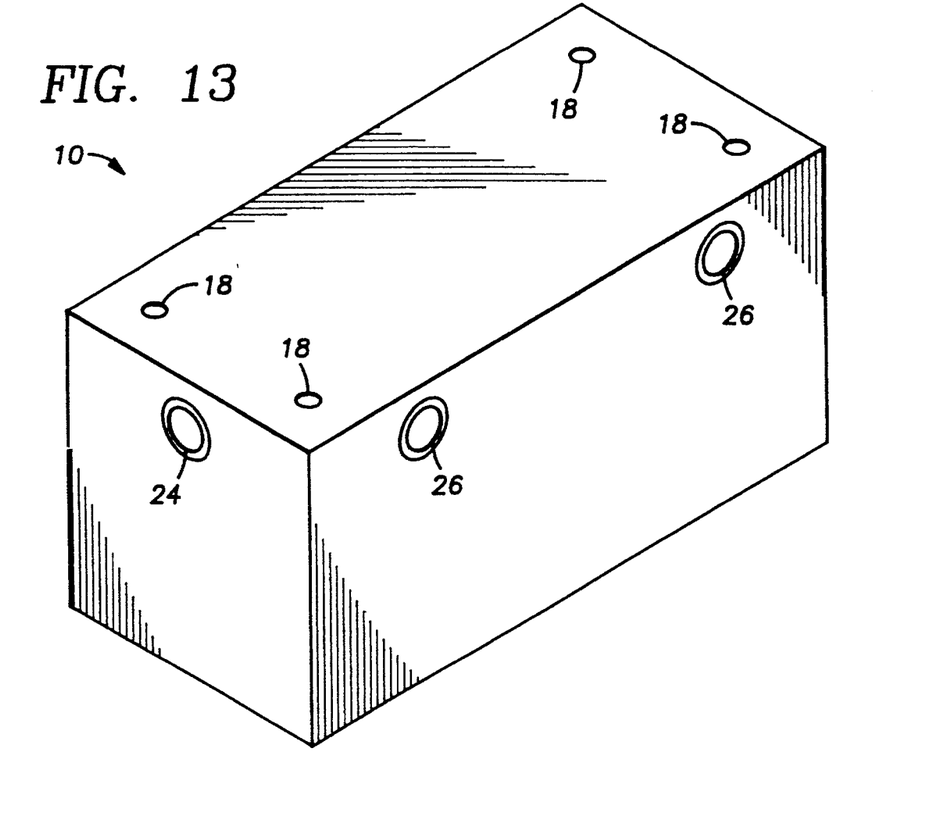
FIG. 13 is another embodiment of the present invention showing a modification of the hollow form shown in FIG. 1.
Figure 14:
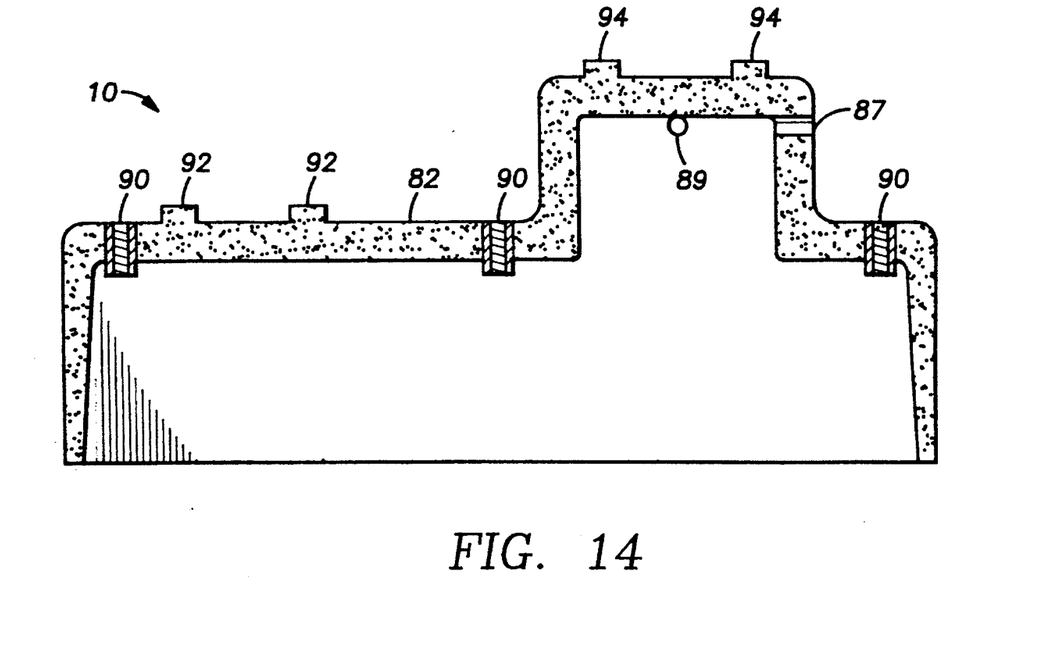
FIG. 14 is another embodiment of the present invention showing a modification of the hollow form shown in FIG. 8.

Referring now to FIGS. 13 and 14, in these embodiments the openings for filling the hollow form 10 are not in the top wall 20 or 82, respectively, but in the vertical walls. As cheaper materials are found to use as the fortifying material 50 to fill the form 10, an injection system may be used to force the material into the opening 24 of the form 10 shown in FIG. 13 or the opening 87 of the form 10 shown in FIG. 14. These openings 24 and 87 may be pieces of polyethylene tubing or of metal which provide a fitting for a pressure injector to introduce the fortifying material 50. Alternately, the non-corrosive metals such as alloy 20, 316 stainless steel or monel may be used. Additional openings 26 and 89, are seep holes which provide an outlet for air and an indication that the fortifying material 50 has properly filled the form 10 to the opening 26 or 89. There may be additional openings (not shown) at the uppermost level of the vertical walls (see opening 89 in FIG. 14) and may be in the vertical wall just below the upper wall 82 in FIG. 14. These openings 26 and 89 may also be used as additional injection openings. For example if the fortifying material 50 is a non-shrinking cement, the cement is forced into openings 24 or 87, and as the cement fills the form 10, air is forced out of openings 26 or 89, respectively. Further as the cement settles, a water layer will form on the top of the cement. This layer of water is permitted to seep out the openings 26 or 89. Additional cement is forced into the form 10. As openings 26 or 89 are filled with a uniform mix of aggregate and cement, the opening is plugged. The opening may be plugged by the aggregate filled fortifying material 50 or a stopper may be inserted in the opening from the outside. A suitable stopper is a conventional truncated cone shape which may be made of polyethylene or other suitable material. The stopper and any exposed tubing may be coated with the same thermosetting resin as the form 10 is made. However, since the exposure is only along the vertical wall and is very small, coating the stopper may not be necessary.

FIG. 14 is a cross-sectional view of form 10 similarly as the form in FIG. 8 but with the injection openings in the vertical wall. This view also shows that the upper wall 82 has two different levels and that the footings 92 and 94 may be made of the same material as the rest of the form 10.

When the foundation is a solid, uniform structure, the tendency for vibrations in the machine placed on the foundation is reduced. A foundation having the form of the present invention made from a thermosetting resin and filled with a fortifying material such as a polymer cement which adhere together provides the strongest structural foundation possible and the vibrations in the machine placed on the foundation are reduced. Thus, not only is the foundation being made of materials free from fluid attack but the foundation of the present invention reduces vibrations in the equipment placed on the foundation, thus extending the life of the equipment as well as the foundation. Forms of the present invention will last for far longer periods of time than coated or normal portland concrete machine foundations.

Various modifications of the specific dimensions as well as the shapes or form of the forms of the present invention are within the scope of the present invention.

We claim:

1. A method for preparing a machine foundation for supporting a machine attached thereto which comprises:

enclosing a maze of vertically extending reinforcement rods with a corrosion resistant form made of a material free from fluid attack selected from the group consisting of an aggregate filled thermosetting resin and thermoplastic resins by placing said form upon a slab, said form having vertical walls to surround said maze and a horizontal upper wall to cover said maze, and at least one wall having at least one opening;

filling said form through said opening with a fortifying material to secure said form with said vertically extending reinforcement rods to said slab; and closing said opening in said form to provide said machine foundation for supporting said machine.

2. A method according to claim 1 wherein said fortifying material is a polymeric concrete.

3. A method according to claim 1 wherein said reinforcement rods are thermoplastic rods welded to said form.

4. A method for repairing a damaged machine base which supports a machine attached thereto which comprises:

enclosing said damaged machine base with a precast corrosion resistant form made of a material free from fluid attack selected from the group consisting of an aggregate filled thermosetting resin and thermoplastic resins, said form comprising vertical walls to surround said machine base and extend vertically above a top surface of said machine base;

substantially filling said form between said vertically extending walls with a fortifying material to secure said form to said machine base; and topping said fortifying material with a layer of said selected material used to make said precast corrosion resistant form to provide said repaired machine base for supporting said machine.

5. A method according to claim 1 wherein said reinforcement rods extend vertically from said slab.

6. A method according to claim 1 wherein said fortifying material is a non-shrinking cementitious cement.

7. A method for preparing a machine foundation for supporting a machine attached thereto which comprises:

enclosing vertically extending reinforcement rods with a corrosion resistant form by placing said form upon a slab, said form having vertical walls to surround said rods and a horizontal upper wall to cover said rods, and at least one wall having at least one opening;

filling said form through said opening with a fortifying material to secure said form with said vertically extending reinforcement rods to said slab; and closing said opening in said form to provide said machine foundation for supporting said machine.

8. A method according to claim 7 wherein said form is made of an aggregate filled thermosetting resin having said vertical walls to surround said rods, and wherein said horizontal upper wall has two horizontal surfaces and at least one opening.

9. A method according to claim 7 wherein said form is made in at least two pieces.

10. A method according to claim 9 wherein said form is made of a vertical section which surrounds said rods and a top section which is said horizontal upper wall.

11. A method according to claim 4 which further includes:

chipping damaged and degraded areas of said machine base.

* * * * *